United States Patent [19]

Palmquist

[11] Patent Number: 4,737,966
[45] Date of Patent: Apr. 12, 1988

[54] ELECTRIC MELTER FOR HIGH ELECTRICAL RESISTIVITY GLASS MATERIALS

[75] Inventor: Ronald W. Palmquist, Horseheads, N.Y.

[73] Assignee: Corning Glass Works, Corning, N.Y.

[21] Appl. No.: 2,577

[22] Filed: Jan. 12, 1987

[51] Int. Cl.4 .............................................. C03B 5/027
[52] U.S. Cl. ......................................... 373/41; 373/39
[58] Field of Search ...................... 373/27, 29, 30, 36, 373/39, 40, 41

[56] References Cited

U.S. PATENT DOCUMENTS 3,806,621  4/1974  Machlan .
3,818,112  6/1974  Clishem et al. .
3,842,180  10/1974  Froberg et al. ....................... 373/41
4,483,008  11/1984  Varrasso .............................. 373/27

FOREIGN PATENT DOCUMENTS 1473091  1/1973  United Kingdom .

Primary Examiner—Roy N. Envall, Jr.
Attorney, Agent, or Firm—A. L. Michaelsen

[57] ABSTRACT

An electric melting furnace is described for melting high electrical resistivity glass, such as E-glass, within a melting chamber surrounded by a relatively low electrically resistivity refractory, such as chromic oxide refractory, by utilizing interconnected peripherally positioned batch electrodes at substantially the same potential as the chromic oxide walls and centrally positioned electrodes which are immersed a greater distance than the batch electrodes. A quiescent zone is formed adjacent a lower portion of the melting chamber and the batch blanket and effective hydrostatic head of the molten bath are adjusted by controlling the immersion of the batch electrodes within the molten bath.

23 Claims, 2 Drawing Sheets

ELECTRIC MELTER FOR HIGH ELECTRICAL RESISTIVITY GLASS MATERIALS

BACKGROUND OF THE INVENTION

In glass manufacturing, glass is generally made by melting a batch of raw glass materials in a refractory lined furnace. The furnace may be heated by hydrocarbon burners, by electricity, or by a combination of burners and electricity. Electrically heated glass furnaces include a refractory lined melting chamber for holding a body of molten glass. Two or more electrodes are submerged in the molten glass for heating the glass through the Joule effect when electric power is applied between the electrodes. The raw glass batch is supplied to, and floats upon, the upper surface of the molten glass, while the molten glass is removed at a submerged throat located in a sidewall or bottom of the melting chamber.

Various forms of refractory materials are used for holding molten glass in glass melting furnaces. Typical glass contact refractory materials for low alkali borosilicate glasses include chromic oxide, zircon and dense fused silica. The useful life of refractories for glass furnaces is primarily determined by the rate which the refractory material dissolves in the molten glass. Of the available refractory materials for use in low alkali borosilicate glass furnaces, chromic oxide has the longest life, lasting at least ten times longer than zircon, the next best refractory material, and up to 100 or more times longer than other refractory materials. Chromic oxide refractory, however, has a low electrical resistivity at temperatures encountered in glass melting furnaces, which low resistivity can cause problems when used in electric furnaces.

Alkali metals, usually sodium or potassium, are often added to glass as a flux to facilitate melting the glass and to lower the viscosity of the molten glass. However, alkali metals cause hot glass to have a low electrical resistivity. Glasses used for manufacturing electrical insulators and much of the glass used for manufacturing glass fibers for textiles, known as E-glass in the industry, typically have less than 1% alkali metal content. As a result, in a molten state, these glasses have a relatively high electrical resistivity compared to normal glass. A typical composition for such glass as set forth in TABLE 20-1 on page 375 of GLASS ENGINEERING HANDBOOK, Second Edition by E. B. Shand, is: $SiO_2$ 54.5%, $Al_2O_3$ 14.5%, $CaO$ 22.0%, $B_2O_3$ 8.5%, $Na_2O$ 0.5%, whereas U.S. Pat. No. 3,818,112 sets forth a typical composition of E-glass as follows: $SiO_2$ 54%, $Al_2O_3$ 14%, $CaO$ 17.5%, $MgO$ 4.5% and $B_2O_3$ 10%.

In the past, attempts to electrically melt glass having a high resistivity in a furnace formed from a chromic oxide refractory material have had limited success. The low resistivity of chromic oxide refractory material and the high resistivity of the molten glass cause a significant portion of the electrical current delivered to the furnace to flow through and heat the refractory rather than the glass. This causes rapid corrosion of the refractory. One solution to this problem is to use a refractory having a high resistivity at the temperature of the molten glass. However, zircon, the next best refractory material, dissolves in the glass much more rapidly than chromic oxide, and after dissolving in the glass at furnace temperatures it often recrystallizes from the glass as the temperature is reduced to working temperatures. Another solution is to use arc circuit electrodes as shown in U.S. Pat. No. 4,514,851, however, symmetrical power distribution within the bath is difficult to obtain, and the glass oxidation state may be difficult to control.

As shown in U.S. Pat. Nos. 3,806,621 and 3,818,112, and British Patent Specification No. 1 473 091, where electric power has been used in the past, the electrodes have been inserted through the bottom refractory, which is usually a highly resistive zircon refractory. The electrodes must be placed and energized to minimize the flow of current through the chromic oxide walls. That is, as pointed out in said U.S. Patents, in order to minimize electrical conduction through the sidewalls, first and second sets of electrodes are arranged through the bottom of the furnace with one set centrally disposed in the tank and the other surrounding the first. In a like manner, the British patent utilizes bottom mounted inner electrode means situated at or near the central region of the furnace, and a plurality of outer electrodes projecting upwardly through the bottom wall adjacent the peripheral wall and encircling the inner electrodes. Such arrangement is used to establish current paths through the molten body between the inner and outer electrode means while avoiding the application of any substantial voltage gradient between the outer electrodes and the peripheral wall.

When melting the glass with only electric power, the batch crust tends to trap the gases released by the melting batch materials, and the trapped gases lead to a reduced melting rate and to melting temperatures which are difficult to control. Thus, a major problem resided in the inability to obtain a controllable batch blanket because of gas bubbles.

It has been found that the use of batch electrodes, which are immersed through the batch crust, tends to eliminate the entrapment of gases in the blanket by preventing the formation of such a hard imprevious crust. The batch electrodes also improve the melting rate of the batch materials by releasing energy immediately beneath the batch crust. By positioning the batch electrodes in certain locations adjacent the crust, the heat transfer to the batch is optimized and the melting rate increased. Further, the use of batch electrodes allows a deeper furnace which is more suitable for producing high quality E-glass.

SUMMARY OF THE INVENTION

According to the present invention, an improved furnace is provided which is suitable for electrically melting glass or other materials having an electrical resistivity higher than the electrical resistivity of a refractory material which defines the melting chamber within the furnace. A low solubility refractory material, preferably chromic oxide refractory for a glass furnace, is shaped to define a melting chamber for holding a body of molten glass. A plurality of batch electrodes are positioned within the chamber for heating the glass by means of the Joule effect, and bottom electrodes may be utilized if desired.

The fusion line and the thickness of the batch crust or blanket must be closely controlled in order to produce consistent quality glass. Accordingly, it is an object of the invention to control the elevation of the effective hydrostatic head within the chamber and provide adjustable batch electrodes.

Another object of the invention is to provide an improved furnace for electrically melting glass. A further object of the invention is to provide an electric furnace capable of melting glass having a predetermined electrical resistivity wherein the refractory walls of the furnace have a predetermined lower electrical resistivity.

Other objects and advantages of the invention will become apparent from the following detailed description with reference being made to the accompanying drawings.

BRIEF DESCRIPTION OF THE PREFERRED EMBODIMENTS

Figure 1:
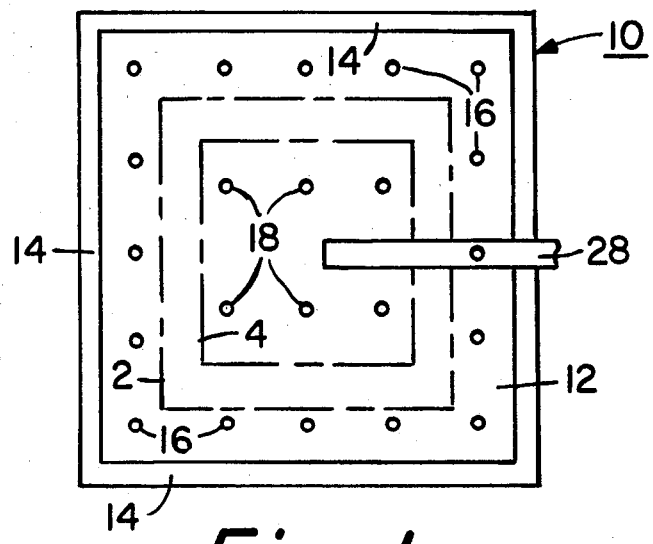
FIG. 1 is a schematic plan view of a furnace for melting glass embodying the present invention.
Figure 2:
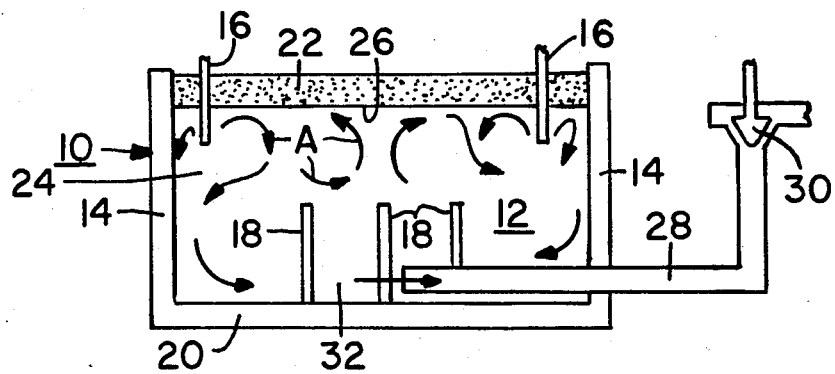
FIG. 2 is a schematic elevational view partially in section of the furnace shown in FIG. 1.

Referring now to the drawings, and particularly FIGS. 1 and 2, a glass melting furnace 10 having a melting chamber 12 surrounded by peripheral walls 14 of a chromic oxide refractory, is shown having a plurality of peripheral batch electrodes 16 and central bottom electrodes 18. The central bottom electrodes 18 project upwardly through a furnace bottom wall 20 which may be of a zircon refractory, whereas the peripheral batch electrodes 16 project through a batch layer 22 which floats on the molten glass bath 24 adjacent the fusion line 26. The embodiment shown in FIGS. 1 and 2 utilizes batch electrodes 16 positioned near the chromic oxide walls 14, and bottom electrodes 18 positioned near the center of the melting chamber 12. The batch electrodes 16 are all interconnected to eliminate the flow of electric current through the walls 14. The interconnected batch electrodes 16 are fired to the bottom electrodes 18, which may be fewer in number since they are immersed more deeply in the batch and have more exposed surface area than the shallowly immersed batch electrodes. A trough or delivery pipe may be utilized to remove the molten glass from a central bottom portion of the melting chamber 12. As shown, a molybdenum delivery pipe 28, positioned adjacent the bottom wall 20 and extending through a peripheral sidewall 14, receives molten glass from a central portion of the melting chamber for delivery to a desired forming area, and flow may be controlled by a suitable valve 30 within the delivery pipe system.

It is well known that upon firing the electrodes, much of the energy is released close to the firing surface or tip of the electrodes due to the concentration of electric current. Accordingly, it is desirable that the batch electrodes 16 be shallowly immersed within the molten bath 24, since they must concentrate the Joule heating near the batch blanket 22. For the bottom electrodes, most of the firing and energy dissipation occurs adjacent the hotter upper end of the electrodes. Therefore, in order to protect the bottom wall 20, it is desirable to have the bottom electrodes 18 deeply immersed within the batch 24 so that the Joule heating effect on the bottom wall is minimized. Accordingly, the amount of heating obtained near the batch electrodes 16 is maximized and produces an increase in the melting rate of the batch materials. However, because there are fewer bottom electrodes than batch electrodes, and since each bottom electrode will carry more than twice the current than each batch electrode, only about one-half of the energy is released near the batch electrodes. Even though the bottom electrodes are immersed further, a substantial amount of power is released close to the bottom electrodes.

The reason that the batch electrodes 16 are positioned peripherally about the melting chamber 12 is because the largest portion of the melting surface area is actually close to the peripheral walls 14. The "half area" contour, which encompasses one-half the melting area of the chamber 12, it is shown by dotted line 2 in FIG. 1. As noted, the central portion of the half area contour has the same shape as the furnace walls, and is centered within the walls, but has only one-half the area of the furnace, whereas the other half of the half area contour lies peripherally about the melting chamber 12 between the furnace walls 14 and the half area contour line 2. Thus, a large portion of the melting surface area is close to the peripheral walls 14, and by placing the batch electrodes close to such walls maximizes the heat transfer to the batch. Since the batch electrodes 16 are all electrically interconnected and at the same potential as the walls 14, no energy is dissipated between the batch electrodes and the walls.

Although modeling could be utilized to produce the best location of the electrodes to optimize heat transfer, since the batch electrodes 16 release approximately one-half of the energy dissipated between the electrodes 16 and 18, the batch electrodes should be placed closer to the walls 14 than the half area contour line 2. As shown in FIG. 1, the batch electrodes 16 are actually positioned within the area between the half area contour line 2 and the peripheral walls 14, which positionment could represent a ¾ area contour. Similarly, the central bottom electrodes 18, which are shown within and bounded by the quarter area contour line 4 (which encompasses one-fourth of the melting area), should be placed near the quarter area contour line 4 so that the energy released thereby effectively melts one half of the batch. The distance that the Joule heated glass must flow to transfer energy to the batch materials is minimized and hence melt rate is maximized.

The particular electric circuitry utilized in the furnace is not of any great importance so long as the batch electrodes near the walls are electrically interconnected and the power dissipation is symmetrically produced within the furnace. That is, the symmetrical dissipation of energy by the proper placement and energization of the electrodes is important to obtain the best operation of the furnace.

In order to facilitate the elimination of gas bubbles from the melt, the furnace itself should be deep enough so that a quiescent zone may develop adjacent the bottom of the furnace. In the past, where only bottom electrodes were utilized, it was virtually impossible to provide a proper quiescent zone. However, by utilizing the batch electrodes, a rapid convection current, shown by arrows A in FIG. 2, is generated close to the fusion line 26, which facilitates the creation of a quiescent zone 32 adjacent the bottom of the furnace. Preferably, the refined glass is removed from a center portion of the quiescent zone by means of an outlet or delivery pipe 28, although a trough may be utilized. However, the use of a delivery pipe is preferred over that of a trough, not only because there is no throat to wear out, but also because it is a more positive means of removing only center glass, which generally has the longest residence time, without the risk of contamination by fresh glass flowing downwardly along a peripheral wall, such as the flow shown by arrows C in FIG. 5 exiting through trough 29. Further, by utilizing a delivery pipe 28, the pipe can be elevated slightly off of the bottom wall 20 so that a stagnant layer of corrosion products is not removed from the bath. Not only do the corrosion products lead to quality defects, but also they serve to protect the bottom refractory from corrosion.

Figure 3:
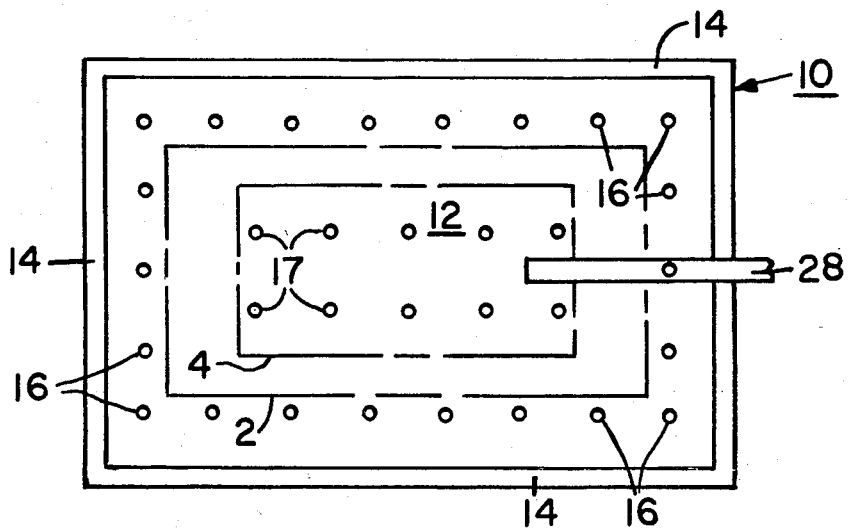
FIG. 3 is a schematic plan view of a furnace for melting glass setting forth a further embodiment of the present invention.
Figure 4:
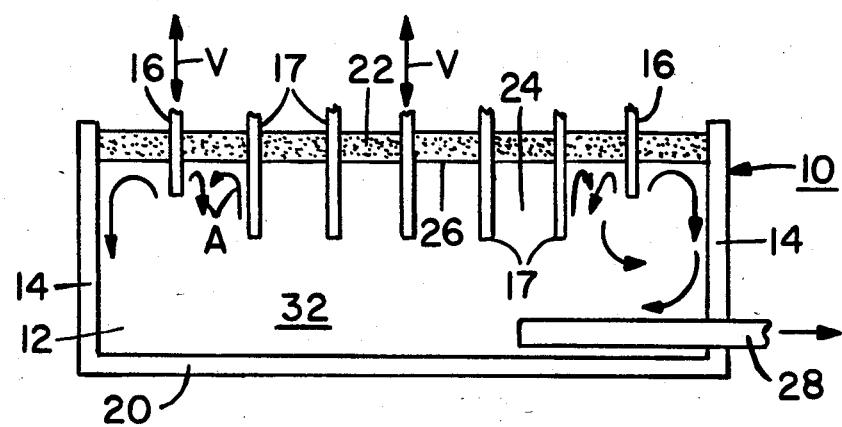
FIG. 4 is a schematic elevational view partially in section of the furnace shown in FIG. 3.
Figure 5:
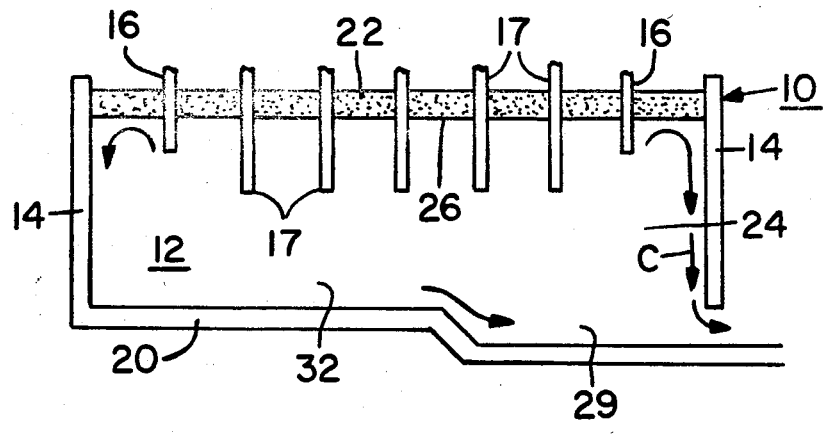
FIG. 5 is a schematic elevational view of a furnace similar to that shown in FIG. 4, but with a trough delivery system.

FIGS. 3-5 disclose a further embodiment of the present invention which eliminates the need for bottom electrodes and uses only batch electrodes. However, the furnace 10 of FIGS. 3-5 is similar to the furnace of FIGS. 1 and 2 in that it includes a melting chamber 12 bounded by peripheral walls 14 and bottom wall 20. A batch layer 22 overlies a molten glass batch 24 adjacent fusion line 26 and a delivery pipe 28 or trough 29 is utilized to deliver the molten bath. Convection currents A are formed adjacent the fusion line 24 and a quiescent zone 32 is formed adjacent the bottom wall 20 of the furnace. A plurality of peripheral batch electrodes 16 are positioned between the half area contour line 2 and the peripheral walls 14. In addition, a plurality of center batch electrodes 19 are positioned within the quarter area contour line 4. As noted particularly in FIGS. 4 and 5, the center batch electrodes 17 should be more deeply immersed than the peripheral electrodes 16 in order to reduce the amount of energy dissipated near the center of the melting chamber 12. That is, the fact that the electrodes 17 are deeply immersed, decreases the current density (amps/in.$^2$) on the electrodes. Since the power dissipated is proportional to $I^2R$, this reduces the resistive heating of the glass near the center of the chamber. As shown particularly by the arrows A in FIG. 4, convection currents, are generated adjacent the fusion line 26, while a large quiescent zone 32 is produced adjacent the bottom wall 20 of the furnace. The use of batch electrodes is particularly advantageous in those situations wherein the furnace is fairly deep, since it would be extremely difficult if not impossible for fully immersed bottom electrodes to retain their upright position during extended use.

The fusion line 26 and the thickness of the batch crust or blanket 22 must be closely controlled in order to produce a consistent glass. If these are controlled, then glass of consistent quality and chemistry is produced. If the fusion line is allowed to move up or down, the immersion of the batch electrodes 16, 17, relative to the height of the batch represented by the fusion line 26, will change. The immersion of the batch electrodes affects the efficiency of energy transfer to the batch 22 to be melted. It has been found that the glass temperature just beneath the fusion line 26 can be increased if the immersion of the batch electrodes 16, 17 is decreased. Hence, an uncontrolled movement of the fusion line will tend to create detrimental temperature variations.

In a preferred embodiment, both the hydrostastic head and the elevation of the batch electrodes should be adjustable. The batch electrodes can be vertically adjustable as shown by arrows V (FIG. 4) by any known mechanical means, and may be manually adjusted or programmed to a suitable sensor, similar to the arc gap controller of U.S. Pat. No. 4,483,008. The hydrostatic head is the level that the glass would take if all of the batch materials in the batch crust were melted. Since the batch materials 22 have only about ⅓ the density of the molten glass bath 24, the elevation of the effective hydrostatic head is about ⅓ up from the fusion line 26 to the top of the blanket 22. Hence, to maintain a given fusion line, the hydrostatic head must be adjusted to produce a desired blanket thickness.

The adjustment of the hydrostatic head can be obtained by utilizing a valve 30 to control the flow of molten bath material 24 out of the furnace 10. The valve maintains a constant level of glass in the forehearth, while allowing the hydrostatic head in the furnace to be independently controlled. However, if such a valve is not used, then the level of the glass in the forehearth must necessarily be close to the desired level of the hydrostatic head in the furnace, and hence the hydrostatic head in the furnace must be held constant. By changing the immersion of the batch electrodes 16, 17 within the molten glass bath 24, the thickness of the blanket 22 may be controlled. If the batch electrodes are lowered, the fusion line 26 will tend to drop and the top of the blanket will rise. Thus, by controlling the elevation of the electrodes, the thickness of the batch blanket can be controlled. In view of the fact that the known all-electric cold crown furnaces with chromic oxide walls had no means for independently controlling the hydrostatic head in the furnace, both blanket thickness and gas entrapment problems resulted.

Although the now preferred embodiments of the invention have been set forth, it will be appreciated by those skilled in the art that various changes and modifications may be made thereto, including round or polyhedral furnace shapes, without departing from the spirit and scope of the invention as defined in the appended claims.

I claim:

1. An electric melter for melting high electrical resistivity glass materials which comprises:
   a melting chamber, said melting chamber being bounded by peripheral wall portions having an electrical resistivity lower than the electrical resistivity of molten glass material retained within said melting chamber;
   means including a plurality of peripheral batch electrodes positioned through a batch blanket retained upon the molten glass material within said melting chamber for eliminating the entrapment of gases by said blanket, and said peripheral batch electrodes being immersed to a desired depth within said molten glass material;
   a plurality of central electrodes positioned within said molten glass material centrally of said peripheral batch electrodes;
   means for providing a Joule effect heating between said peripheral batch electrodes and said central electrodes;
   said peripheral batch electrodes being at substantially the same potential as said peripheral wall portions;
   and means for withdrawing molten glass material from a lower portion of said electric melter.

2. An electric melter as defined in claim 1 wherein said central electrodes project within said molten glass material a distance greater than the projection of said peripheral batch electrodes within such molten glass material.

3. An electric melter as defined in claim 1 wherein said plurality of central electrodes project within said molten glass material through a bottom wall of said melting chamber.

4. An electric melter as defined in claim 1 wherein said plurality of central electrodes project within said molten glass material through said batch blanket centrally of said peripheral batch electrodes.

5. An electric melter as defined in claim 1 wherein a closed half area contour line, substantially equally spaced from said peripheral wall portions, defines half the melting area of said melting chamber within said line and half of said area between said line and said peripheral wall portions, and said peripheral batch electrodes being positioned between said half area contour line and said peripheral wall portions.

6. An electric melter as defined in claim 1 including means for controlling the level of the hydrostatic head within said melting chamber, and said control means includes means for changing the immersion of batch electrodes within said molten glass material.

7. An electric melter as defined in claim 1 including means for controlling the thickness of said batch blanket retained upon the molten glass material, and said means including means for changing the immersion of batch electrodes in said molten glass material.

8. An electric melter as defined in claim 1 including a quiescent zone adjacent a lower portion of said melting chamber, and said withdrawing means being positioned to withdraw molten glass material from said quiescent zone.

9. An electric melter as defined in claim 1 including means for controlling the melting rate of the batch blanket, and said control means includes means for changing the immersion of said batch electrodes within said molten glass material.

10. An electric melter as defined in claim 1 wherein said peripheral wall portions are formed of chromic oxide refractory, and said high electrical resistivity molten glass material is a molten bath of E-glass.

11. A method of electrically melting E-glass with a cold crown batch blanket within a melting chamber surrounded by chromic oxide peripheral wall portions which comprises:
  providing a melting chamber surrounded by chromic oxide peripheral wall portions;
  providing a molten bath of E-glass within said melting chamber;
  providing a batch blanket of material to be melted upon said E-glass bath;
  eliminating the entrapment of gases in said batch blanket by at least immersing a plurality of peripheral batch electrodes through said batch blanket and into said molten bath of E-glass;
  immersing a plurality of central electrodes into said bath of E-glass centrally of said peripheral batch electrodes;
  interconnecting said peripheral batch electrodes to inhibit the flow of electric current to said chromic oxide peripheral walls;
  providing an electric circuit to fire between said batch electrodes and said central electrodes and provide Joule heating of the molten batch;
  and removing molten E-glass from a lower portion of said melting chamber.

12. A method of electrically melting E-glass as defined in claim 11 including the step of immersing said central electrodes into said bath of E-glass a distance greater than the immersion of said peripheral batch electrodes.

13. A method of electrically melting E-glass as defined in claim 11 including the step of shallowly immersing said peripheral batch electrodes and concentrating the Joule heating near the batch blanket.

14. A method of electrically melting E-glass as defined in claim 11 including the step of immersing said central electrodes to a depth such that the firing end portion thereof is removed sufficiently from the bottom of said melting chamber so as to form a quiescent zone.

15. A method of electrically melting E-glass as defined in claim 11 including the steps of providing fewer central electrodes than said peripheral batch electrodes and immersing said central electrodes through the bottom of said melting chamber.

16. A method of electrically melting E-glass as defined in claim 15 including the step of forming a quiescent zone adjacent a lower portion of the melting chamber.

17. A method of electrically melting E-glass as defined in claim 11 including the steps of determining a half area contour line, having the same shape as the peripheral wall portions, such that half of the melting area within the melting chamber is within said half area contour line and half of the melting area is between said contour line and said peripheral wall portions, and positioning said peripheral batch electrodes within said melting chamber between said half area contour line and said peripheral wall portions.

18. A method of electrically melting E-glass as defined in claim 11 including the step of providing a quiescent zone adjacent a lower portion of said melting chamber, and removing refined E-glass from said quiescent zone.

19. A method of electrically melting E-glass as defined in claim 11 including the step of controlling the level of the fusion line of the molten E-glass by changing the immersion of the batch electrodes within such E-glass.

20. A method of electrically melting E-glass as defined in claim 11 including the step of controlling the thickness of the batch material on said bath of molten E-glass, and thereby controlling the effective hydrostatic head.

21. A method of electrically melting E-glass as defined in claim 11 including the steps of defining a quarter area contour line, having the same shape as said outer peripheral walls, but defining therewithin one quarter of the melting area of said melting chamber and three quarters of the melting area being between said line and peripheral walls, and positioning said center electrodes near said quarter area contour line.

22. An electric melting furnace for melting E-glass which comprises:
  a melting chamber, said melting chamber being bounded by peripheral walls formed of chromic oxide refractory;
  said melting chamber retaining a bath of molten E-glass therewithin, and a batch blanket of material to be melted on said molten bath;
  means for eliminating the entrapment of gases by said batch blanket, said elimination means including a plurality of batch electrodes positioned through said batch blanket and immersed within said molten bath about a peripheral area of the bath within the melting chamber;
  a plurality of central electrodes immersed within a central portion of said molten bath a distance greater than the distance of immersion of said peripherally positioned batch electrodes;

means for energizing electrical current between said peripheral batch electrodes and said central electrodes to produce Joule heating within said molten bath;

means for maintaining a quiescent zone adjacent a lower portion of said melting chamber;

and means for withdrawing refined E-glass from said quiescent zone.

23. An electrical melting furnace as defined in claim 22 wherein said batch electrodes are positioned within an area between a half area contour line and said peripheral wall portions, said central electrodes are positioned near the quarter area contour line, and said half area contour line and said quarter area contour line having the same shape as said peripheral wall portions but enclosing one half and one quarter, respectively of the melting area of said melting chamber.

* * * * *